US006220444B1

United States Patent
Calhoun

(12) United States Patent
(10) Patent No.: US 6,220,444 B1
(45) Date of Patent: Apr. 24, 2001

(54) METHOD AND APPARATUS FOR MARKING CONTAINERS WITH MAGNETIC CODE AND DETECTING THE MARKED CONTAINER USING A MAGNETIC SENSING DEVICE

(75) Inventor: Fred L. Calhoun, Rolling Hills, CA (US)

(73) Assignee: Industrial Dynamics Co., Ltd., Torrance, CA (US)

( * ) Notice: Subject to any disclaimer, the term of this patent is extended or adjusted under 35 U.S.C. 154(b) by 0 days.

(21) Appl. No.: 09/270,183

(22) Filed: Mar. 15, 1999

(51) Int. Cl.$^7$ ........................................................ B03C 1/00
(52) U.S. Cl. .............................. 209/8; 209/214; 209/523
(58) Field of Search ................... 209/4, 8, 213, 209/214, 522, 523, 562, 567; 324/251, 261

(56) References Cited

U.S. PATENT DOCUMENTS

| | | | |
|---|---|---|---|
| 3,057,477 | * | 10/1962 | Rappaport ............................ 209/8 X |
| 3,696,946 | | 10/1972 | Hunter et al. . |
| 3,863,764 | * | 2/1975 | Myslinski et al. ................ 209/567 X |
| 4,113,609 | * | 9/1978 | King et al. .......................... 209/562 X |
| 4,249,661 | | 2/1981 | Lem . |
| 4,596,107 | * | 6/1986 | Pflger, Sr. .......................... 209/523 X |
| 4,914,964 | | 4/1990 | Speiser . |
| 5,335,777 | | 8/1994 | Murphy et al. . |
| 5,565,687 | | 10/1996 | Berrill . |
| 5,793,200 | | 8/1998 | Berrill . |

FOREIGN PATENT DOCUMENTS

1606194 * 11/1990 (SU) ......................................... 209/8

* cited by examiner

Primary Examiner—Taun N. Nguyen
(74) Attorney, Agent, or Firm—Irving Keschner

(57) ABSTRACT

A conveyor system for conveying items, such as bottles and cans, from a first position whereat they are magnetically encoded by using magnetic energy and wherein the coded item is detected at a spaced apart second position using a magnetic sensing device such as a Hall effect sensor. The magnetic encoder can place different levels of magnetism on the container caps and the Hall effect device can detect these different levels of magnetism. By using this technique, containers may be divided into different categories by placing different levels of magnetism on them. The Hall effect device can differentiate these different levels of magnetism which allows the system to do selective sorting at the downstream station.

5 Claims, 2 Drawing Sheets

METHOD AND APPARATUS FOR MARKING CONTAINERS WITH MAGNETIC CODE AND DETECTING THE MARKED CONTAINER USING A MAGNETIC SENSING DEVICE

BACKGROUND OF THE INVENTION

1. Field of the Invention

The present invention provides a system for conveying containers from a first location to a second location, the containers being marked at the first location with a magnetic pulse, the magnetic pulse being detected at the second location using a magnetic sensing device.

2. Description of the Prior Art

Systems for conveying containers from a first location whereat a selected container is marked, or encoded, to a second location wherein the selected container is identified based on the markings thereon have been available for many years. Typically, containers are marked with visible indicia and the container detected using a light source, optics, photodector and electronic processing circuitry. One of the problems inherent in the prior art systems is that the technique used to produce visual indicia marking requires consumables, which in addition to the expense, is messy, causes system clogging, etc. In addition, the optically based detection systems need frequent maintenance to keep the conveyor system operating efficiently.

Further, In addition, it is particularly difficult to track a single container (can or bottle) on a conveyor system, the container being marked at one location and typically rejected at a second location downstream without losing track of the marked container. Various prior art detecting systems are disclosed in U.S. Pat. Nos. 4,914,964 to Speiser (system for measuring the alignment between two moving targets); U.S. Pat. No. 5,335,777 to Murphy et al (apparatus for tracking data associated with a conveyor belt load being conveyed from a first station to a spaced apart second station); U.S. Pat. No. 4,249,661 to Lem (apparatus for sorting various loads, code being first imprinted or otherwise affixed to the item and read downstream by conventional optical and magnetic means); and U.S. Pat. No. 3,696,946 to Hunter et al (automatic conveyor system to monitor the position of the conveyor carrier and to cause a carrier to unload its contents when it reaches an appropriate receiving bin).

Hall effect devices (as is well known, the Hall effect describes the disturbance of the lines of current flow in a conductor due to the application of a magnetic field, resulting in an electric potential gradient transverse to the direction of current flow) have been used in various system processes. For example, Hall effect devices have been used to determine the level of liquid in containers (see for example, U.S. Pat. No. 5,565,687). U.S. Pat. No. 5,793,200 discloses a position sensing system which utilizes a magnet to actuate a detecting array of solid state Hall effect devices.

The use of Hall effect sensors, or decoders, provides significant advantages in that the detector (single or in an array) is less costly than optical based detector systems, are more accurate and reliable, and most importantly, the detection process is insensitive to the conveyor speed thus minimizing the possibility of detection error. However, any other magnetic sensing device may be used, particularly if the conveyor is one that runs at constant speed. The Hall effect device can also detect different levels of magnetic strength.

The inventor of the present invention is unaware of any conveyor belt system which has utilized a magnetic sensing device, such as Hall effect devices, to detect a magnetically coded item transported on a conveyor belt from one location to another remote location.

What is thus desired is to provide a marking technique for a bottle or can conveyor system wherein the mark is readable for extended periods of time subsequent to the marking and wherein the marked item is detected downstream using a simple and cost efficient detector device. For example, this marking technique should be capable of being used to mark containers from specific filler valves or capper heads so they can be detected and rejected downstream for quality control evaluation purposes. Production lines typically run so fast that this process cannot be carried out manually.

SUMMARY OF THE PRESENT INVENTION

The present invention provides a conveyor system for conveying items, such as bottles and cans, from a first position whereat they are magnetically encoded by using magnetic energy and wherein the marked item is detected at a spaced-apart second location using a magnetic sensing device, preferably a Hall effect device.

The use of Hall effect devices to detect magnetically encoded items positioned on a conveyor belt system provides significant advantages including the fact that the detection system is insensitive to the velocity (speed) of the conveyor belt, thus avoiding potential detection inaccuracies.

DESCRIPTION OF THE DRAWINGS

For a better understanding of the invention as well as other objects and further features thereof, reference is made to the following description which is to be read in conjunction with the accompanying drawing wherein.

DESCRIPTION OF THE INVENTION

Figure 1:
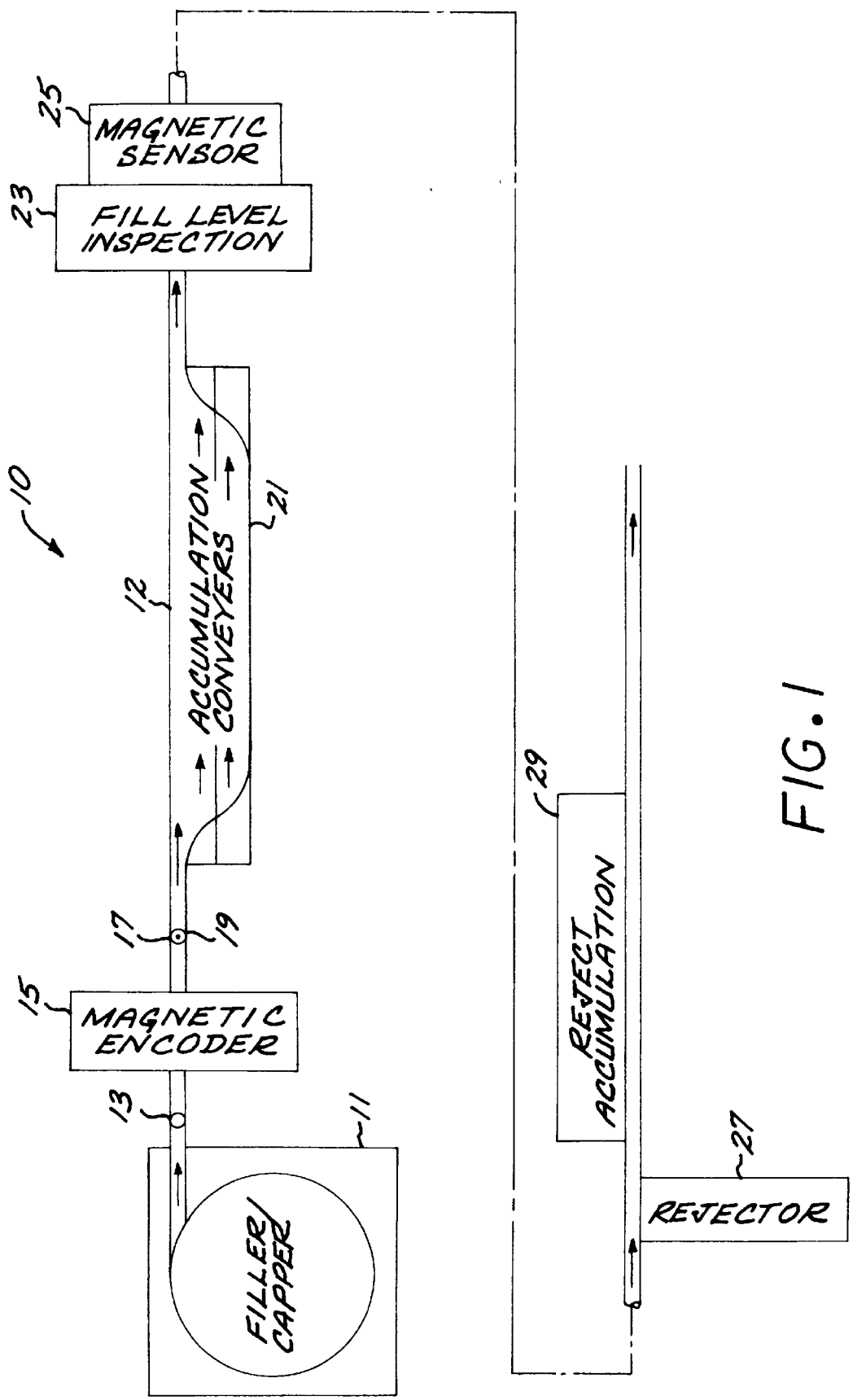
FIG. 1 is a simplified plan view of a first embodiment of the conveyor belt system of the present invention.

Referring now to FIG. 1, a conveyor line system 10 incorporating the teachings of the present invention is illustrated. The conveyor line is provided with a belt, or chain, 12 to move containers 13 and 17 (only two shown for illustrative purposes although many more containers are on the belt at the same time) such as metal cans, exiting conventional filler 11 along the conveyor line toward magnetic encoder 15.

The conveyor line system 10 is similar to systems sold by Industrial Dynamics Corporation, Torrance, Calif., such as the FT-50 fill level inspection system. In accordance with the teachings of the present invention, magnetic head encoder station 15 is provided to mark a unique magnetic code on items, such as metal bottle caps or metal cans 13, passing therethrough (the coded medium must be a ferrous material so it can be magnetized. The code can be formed by a single magnetic pulse or a plurality of pulses) and may be used to mark a particular filler station so the filler performance can be evaluated. In the figure, a can 17 is shown after magnetic code 19 is formed thereon. Can 17 (and other cans not shown) is moved by the conveyor belt 12 from left to right as viewed on the drawing. Accumulation conveyors 21 are provided along the belt path to accommodate cans/bottles if a line slowing or breakdown occurs, evening out the can/bottle flow. A fill level inspection station 23 is provided to, inter alia, ascertain whether the cans/bottles have been properly filled. A magnetic sensor 25 is provided at the output of inspection station 25 to read the code 19 formed on cans/bottles passing therethrough. In the preferred embodiment of the present invention, magnetic sensor 25 comprises a Hall effect device.

Using Hall effect devices to detect an item, such as a can or bottle, as it moves along a conveyor belt provides numerous advantages compared to currently used detector systems which are, for the most part, optical based systems. In particular, the Hall effect detector device is essentially DC sensitive (i.e. only responsive to the magnetic encoding 19 on the top of the can 17) and not dependent on the speed or velocity of the conveyor belt. Finally, the magnetic encoding pulse is readable for long time periods of time after the initial marking step, thus avoiding a problem if conveyor line stops with the items thereon between the coding and detection devices.

The magnetic encoded pulse, or series of pulses, is generated by using a conventional magnetic device. Hall effect devices are available commercially for use as the sensing device. For example, Allegro Microsystems, Inc., Worcester, Mass., manufactures a number of Hall-effect integrated circuits which can be utilized in the present invention. The data detected on a particular item by the Hall effect device is decoded by a conventional microprocessor and the appropriate conveyor system device is then activated, the detected item thus being diverted to a particular location. A rejector 27 is provided toward the end of the line to remove cans/bottles that do not meet specifications, the rejected items being forced into reject accumulation 29.

Figure 2:
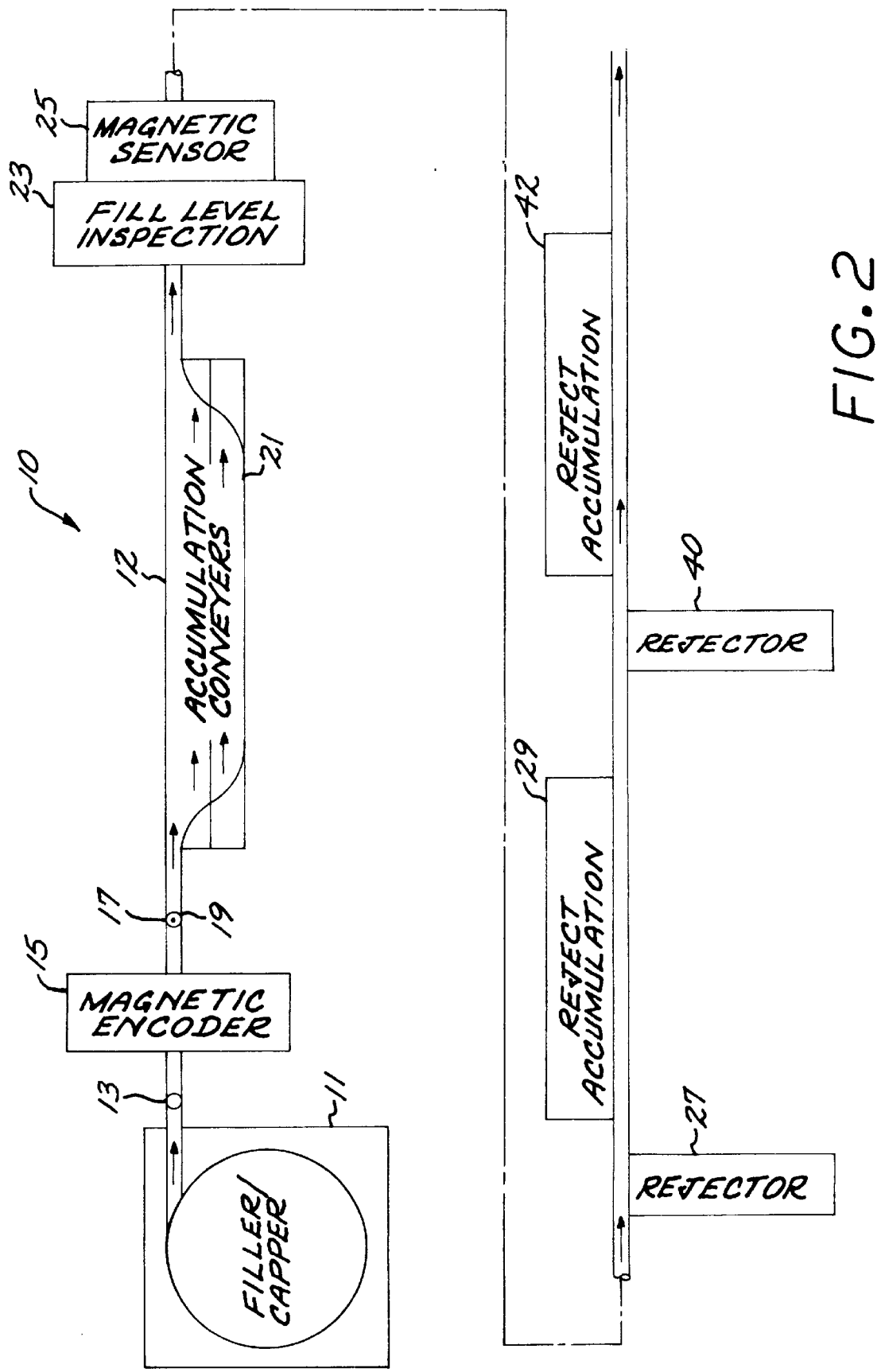
FIG. 2 is a plan view, similar to FIG. 1, of a second embodiment of the present invention.

It should be noted that the magnetic encoder can be designed to different levels of magnetism on the container caps and the Hall effect device can detect these different levels of magnetism. By using this technique, containers may be divided into different categories by placing different levels of magnetism on them. The Hall effect device can differentiate these different levels of magnetism which allow the system to do selective sorting at the downstream station. FIG. 2 is illustrative of a system which can implement selective sorting (elements identified in FIG. 2 with the same reference numerals of elements shown in FIG. 1 are essentially identical in function). In particular, rejector 40 and reject accumulation 42 are added downstream from the corresponding rejector 27 and reject accumulation 29, respectively. This arrangement enables a system to be provided wherein magnetic encoder 15 can apply pulses of different magnetic strengths to preselected cans placed on the conveyor belt 12 and wherein magnetic sensor 25 and its associated electronics can cause accumulator/rejector 27 and 29 to reject cans encoded with a first level of magnetism and accumulator/rejector 40 and 42 to reject cans encoded with a second level of magnetism allowing selective sorting to be provided.

The present invention thus provides an inspection system utilizing magnetic encoder/decoder devices to detect the position of cans/bottles along a conveyor line, the detection process being insensitive to line speed variations.

While the invention has been described with reference to its preferred embodiment, it will be understood by those skilled in the art that various changes may be made and equivalents may be substituted for elements thereof without departing from the true spirit and scope to the invention. In addition, many modifications may be made to adapt a particular situation or material to the teaching of the invention without departing from its essential teachings.

What is claimed is:

1. Apparatus for placing and detecting data on a bottle having top and bottom portions, a ferrous cap being positioned on the top portion of said bottle, said bottle being conveyed on a belt conveyor between a first station and a second station, said bottle extending in a direction substantially perpendicular to the direction of said belt conveyor, comprising:

magnetic means located at said first station for placing magnetic code on said ferrous cap; and a magnetic sensor located at said second station for detecting said magnetic code placed on said ferrous cap.

2. The apparatus of claim 1 wherein said magnetic sensor is a Hall effect device.

3. The apparatus of claim 1 wherein said bottle has top and bottom portions, said ferrous cap being positioned on said bottle top, said bottle extending in a direction substantially perpendicular to the direction of said conveyor belt as it is conveyed from said first station to said second station.

4. A method for detecting data placed on said first and second bottles, each bottle having top and bottom portions, said first bottle having a first ferrous cap positioned on the top portion thereof, said second bottle having a second ferrous cap positioned on the top portion thereof, said first and second bottles being conveyed on a conveyor belt between a first station and a second station comprising the steps of:

placing magnetic code on each of said ferrous caps, said magnetic code placed on said first ferrous cap being different than the magnetic code placed on said second ferrous cap; and detecting the magnetic code placed on said first and second ferrous caps at said second position using a magnetic sensor.

5. The method of claim 4 wherein said magnetic sensor is a Hall effect device.

* * * * *